(12) United States Patent
Luebke

(10) Patent No.: US 8,118,440 B1
(45) Date of Patent: Feb. 21, 2012

(54) CAPTURE SYSTEM AND METHOD EQUIPPED WITH AT LEAST ONE STEERABLE DEFLECTING MIRROR

(75) Inventor: David Patrick Luebke, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 11/761,995

(22) Filed: Jun. 12, 2007

(51) Int. Cl.
*G02B 5/08* (2006.01)

(52) U.S. Cl. ........................................................ 359/846

(58) Field of Classification Search .................. 359/846, 359/223.1–226.1, 290, 291, 871, 872
See application file for complete search history.

(56) References Cited

U.S. PATENT DOCUMENTS

| | | | | |
|---|---|---|---|---|
| 6,090,100 | A * | 7/2000 | Hohla | 606/5 |
| 6,714,336 | B2 | 3/2004 | Orcutt et al. | 359/225.1 |
| 6,930,707 | B2 * | 8/2005 | Bates et al. | 348/78 |
| 7,019,434 | B2 * | 3/2006 | Helmbrecht | 310/309 |
| 2001/0029674 | A1 | 10/2001 | Cutler | 33/1 M |
| 2002/0099362 | A1 * | 7/2002 | Hohla | 606/5 |
| 2004/0165243 | A1 * | 8/2004 | Helmbrecht | 359/223 |
| 2006/0291042 | A1 * | 12/2006 | Alfano et al. | 359/368 |

OTHER PUBLICATIONS

Shree Nayar et al., "Scene Geometry from Projector Defocus" SIGGRAPH 2006.
Marc Levoy et al., "Synthetic Aperature Confocal Imaging" SIGGRAPH 2004.
"Scanning Two Axis Tilt Mirrors" http://www.memsoptical.com/prodserv/products/twotiltmir.htm.
"MicroMirrors Family" http://www.appliedmems.cc/htmlmems/p_mm.html.
U.S. Appl. No. 11/761,985, filed Jun. 12, 2007.
Final Office Action Summary from U.S. Appl. No. 11/761,985 mailed on Jul. 24, 2009.
Office Action Summary from U.S. Appl. No. 11/761,985 mailed on Dec. 28, 2009.
Final Office Action Summary from U.S. Appl. No. 11/761,985 mailed on Jun. 25, 2010.

* cited by examiner

*Primary Examiner* — Stephone Allen
(74) *Attorney, Agent, or Firm* — Zilka-Kotab, PC

(57) ABSTRACT

A capture system and method are provided for capturing an object utilizing at least one mirror. In use, a first angular dimension, a second angular dimension, and a curvature of the mirror are controlled for manipulating the capture of the object. By this design, a variety of applications may be provided.

23 Claims, 10 Drawing Sheets

CAPTURE SYSTEM AND METHOD EQUIPPED WITH AT LEAST ONE STEERABLE DEFLECTING MIRROR

FIELD OF THE INVENTION

The present invention relates to capture systems, and more particularly to capturing objects utilizing controllable mirrors.

BACKGROUND

Advanced manufacturing techniques have been developed for allowing the control of various aspects of a mirror for display purposes. For example, prior art FIG. 1 illustrates a varifocal display system 100 including a deflecting mirror 102. As shown, a curvature of the deflecting mirror 102 is capable of deflecting between a convex and a concave orientation by way of vibration, etc. In use, a CRT or projector 104 projects one or more images onto the deflecting mirror 102, such that the image(s) is thereafter viewed by a viewer 106.

By controlling the curvature of the deflecting mirror 102 in such manner, a focus of an image may be varied as desired to show different depths, etc. For instance, by decomposing an image into elements at different depths and time-multiplexing the depth elements to be projected onto the deflecting mirror 102 at the appropriate moment for the instantaneous deflection of the mirror 102, the different elements may be presented at an optical distance consistent with an intended depth.

Prior art FIG. 2 illustrates a display system 200 including a steerable mirror 202. In use, the steerable mirror 202 is capable of being moved in two angular dimensions (e.g. with respect to an x-axis, a y-axis, etc.). By this design, light from an RGB projector 204, for example, may be reflected off of the steerable mirror 202 and directed to one or more pixels of a screen 206 in the manner shown. While not shown, it should be noted that the display system 200 may be equipped with one or more lenses situated between the RGB projector 204 and the mirror 202 and/or between the mirror 202 and the screen 206. By controlling the various dimensions of the steerable mirror 102 during use, a variety of applications are supported such as scanning, photonic switching, etc.

To date, there has been no feasible and/or effective attempt to combine the technological principles of the foregoing display system mirrors of FIGS. 1-2, particularly in the art of capture systems. There is thus a need for addressing these and/or other issues associated with the prior art.

SUMMARY

A capture system and method are provided for capturing an object utilizing at least one mirror. In use, a first angular dimension, a second angular dimension, and a curvature of the mirror are controlled for manipulating the capture of the object. By this design, a variety of applications may be provided.

BRIEF DESCRIPTION OF THE DRAWINGS

Prior art

Prior art

DETAILED DESCRIPTION

Figure 1:
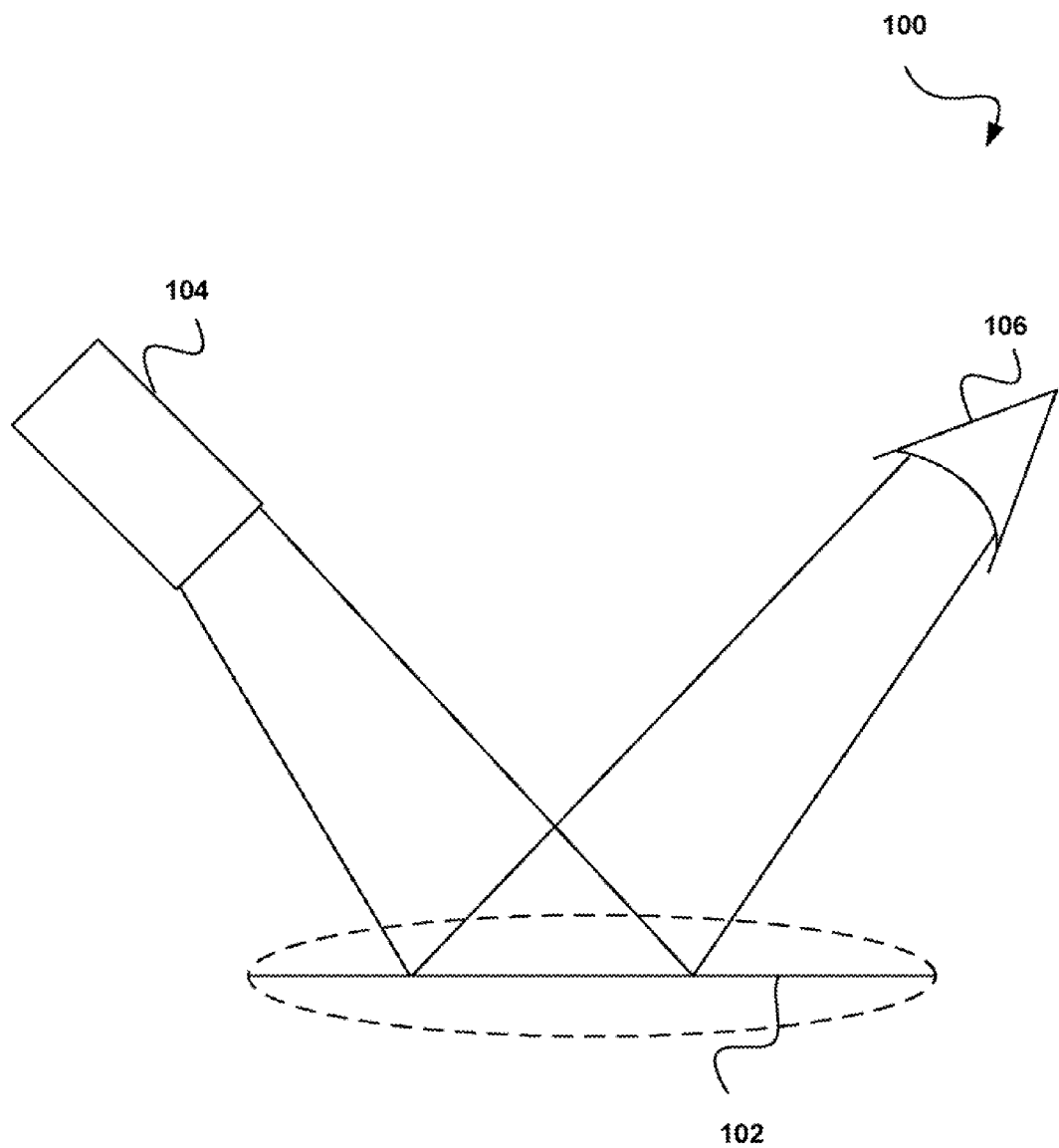
FIG. 1 illustrates a varifocal display system including a deflecting mirror.
Figure 2:
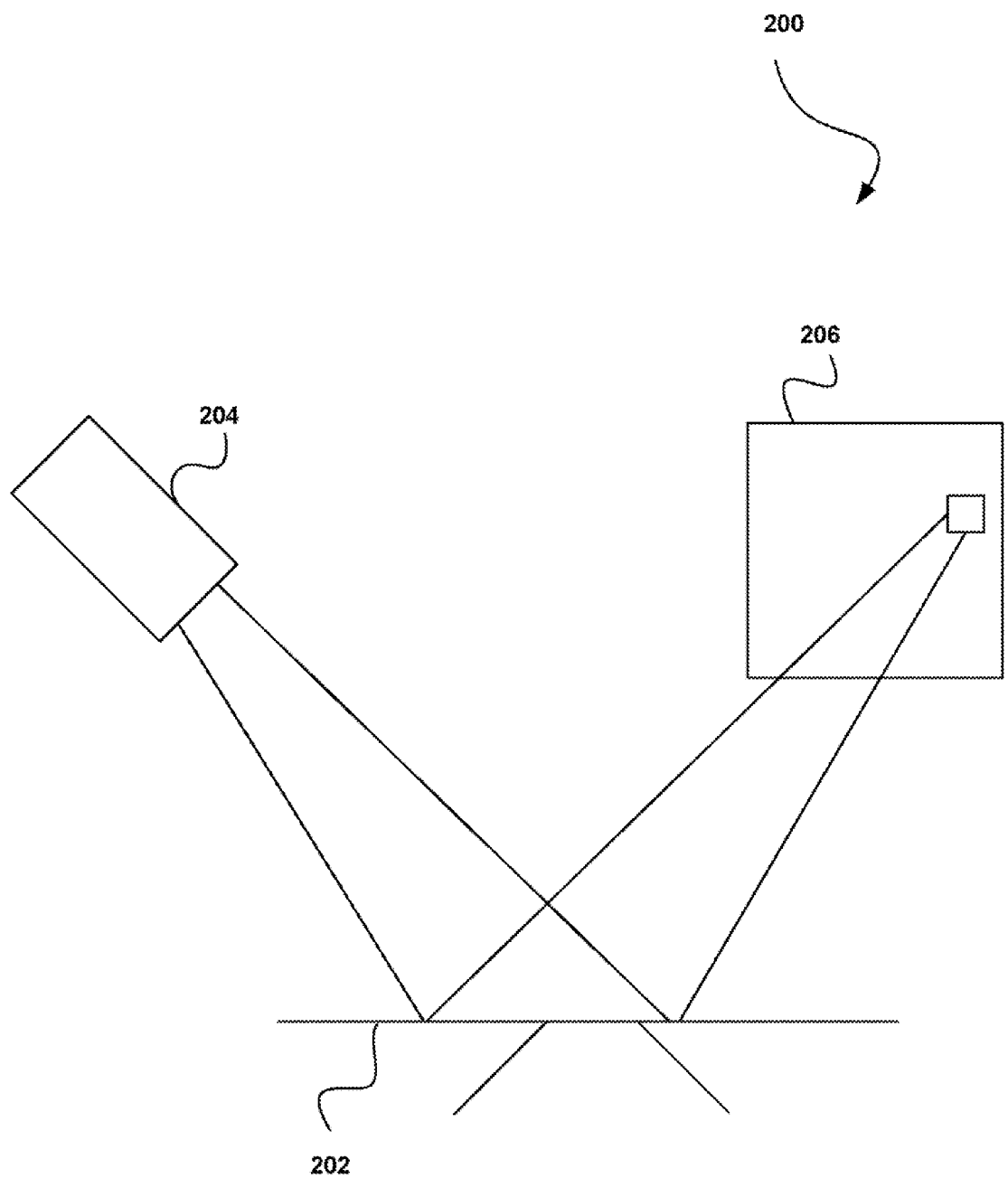
FIG. 2 illustrates a display system including a steerable mirror.
Figure 3:
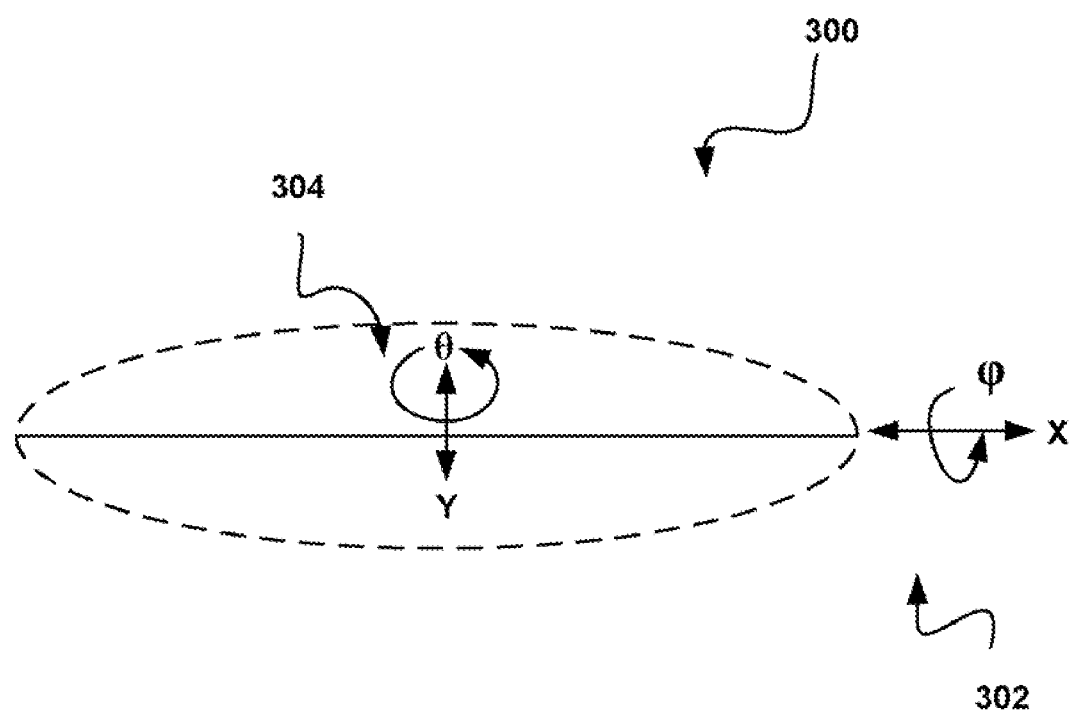
FIG. 3 shows a mirror that is both deflecting and steerable, in accordance with one embodiment.

FIG. 3 shows a mirror 300 that is both deflecting and steerable, in accordance with one embodiment. As shown, the mirror 300 is controllable in a first angular dimension 302 (e.g. a φ-dimension about an x-axis) and a second angular dimension 304 (e.g. a θ-dimension about a y-axis). By this design, the mirror 300 may be steered in such dimensions, as desired.

In addition, a curvature of the mirror 300 may be controlled. In one embodiment, the control of such curvature may result in the mirror 300 having a convex shape, a flat shape, a concave shape, or a combination thereof over time. By permitting the mirror 300 to be controlled in each of the foregoing three aspects, a variety of display and/or capture applications may be provided where the display/capture of an object may be manipulated for a variety of purposes.

In one embodiment, the mirror 300 may be microscopic. For example, the mirror 300 may have a length of less than 1 millimeter. In another embodiment, the minor 300 may even be as small as a few or even a single micron in one embodiment, the speed with which the foregoing aspects of the mirror 300 may be controlled may be increased with a decrease in mirror size. Further, any decrease in a size of the mirror 300 may result in optional power savings required for the control thereof, in addition to saving power to extend battery life, etc., such savings in power dissipation may be desired to reduce heat produced, meet cooling requirements, etc. Of course, other embodiments are contemplated where the mirror 300 takes on larger sizes.

More illustrative information will now be set forth regarding various optional architectures and features with which the foregoing framework may or may not be implemented, per the desires of the user. Specifically, different embodiments will now be set forth for providing for the control of the two angular dimensions and curvature, as well as various applications that may, in turn, be implemented.

It should be strongly noted that the following information is set forth for illustrative purposes and should not be construed as limiting in any manner. Any of the following features may be optionally incorporated with or without the exclusion of other features described.

Figure 4A:
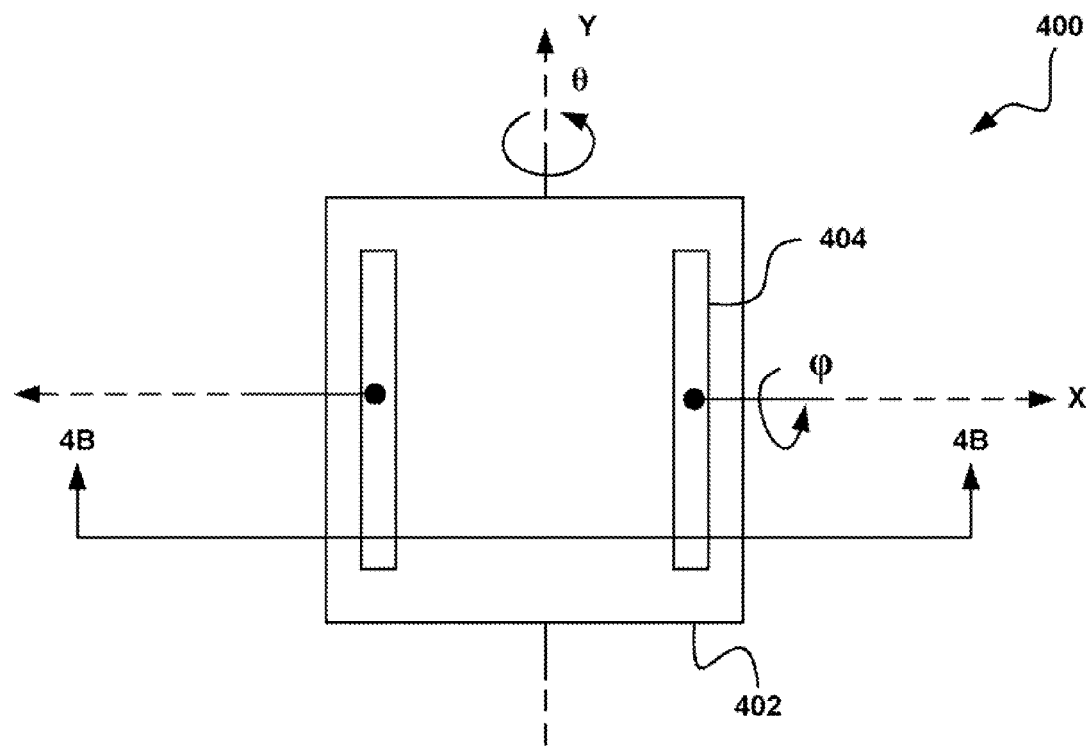
FIG. 4A is a bottom view of a system for providing a deflecting and steerable mirror, in accordance with one embodiment.

FIG. 4A is a bottom view of a system 400 for providing a deflecting and steerable mirror, in accordance with one embodiment. As an option, the present system 400 may be implemented to provide the functionality of the mirror 300 of FIG. 3. Of course, however, the system 400 may be implemented in any desired environment. It should also be noted that the aforementioned definitions may apply during the present description.

As shown, a mirror 402 may be mounted on a gimbal 404 for allowing movement in a first angular dimension (e.g. about an x-axis). Such gimbal 404 further allows movement of the mirror 402 in a second angular dimension (e.g. about a y-axis). As will soon become apparent, a plurality of the mirrors 402 may be configured in a matrix for display/capture purposes.

Figure 4B:
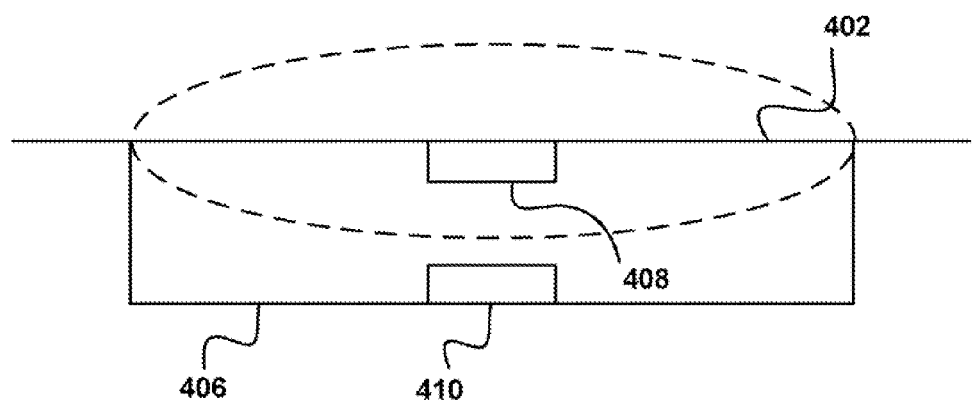
FIG. 4B is a side cross-sectional view of the system of FIG. 4A taken along line 4B-4B illustrating a mechanism for controlling a mirror curvature thereof in accordance with one embodiment.

FIG. 4B is a side cross-sectional view of the system 400 of FIG. 4A taken along line 4B-4B illustrating a mechanism for controlling a mirror curvature thereof, in accordance with one embodiment. As shown, the mirror 402 is mounted to a base 406 (of the gimbal 404). For reasons that will soon become apparent, the mirror 402 may include any material that is, at least in part, reflective and flexible. Just by way of example, the material may include, but is not limited to very thin membranes of silicon, nickel or silver-plated membranes, polymer materials such as Mylar®, and/or any other material, for that matter. In some embodiments, such material need not necessarily (but may) be flexible on a macroscopic scale, since the deflecting, mirror layer may be very thin and the amount of deflection required may be very small.

With continuing reference to FIG. 4B, a first electrode 408 is mounted underneath the mirror 402 in the manner shown. Additionally, a second electrode 410 is mounted to the base 406. In use, repelling and/or attracting charges may be applied to the first electrode 408 and the second electrode 410 for forcing the mirror 402 to take on a convex and/or convex shape, as illustrated.

While electric charges are set forth above as one example of how the curvature of the mirror 402 may be controlled, it should be noted that other techniques are contemplated. Just by way of example, the aforementioned first electrode 408 and second electrode 410 may be substituted with thermocouples constructed by combining particular materials (e.g. gold, silver, etc.) for controlling the curvature with thermal variations resulting from an applied charge. Still yet, magnetic, resonate, vibrato mechanisms are also contemplated along with any other technique capable of controlling the curvature in the abovementioned manner.

Figure 5:
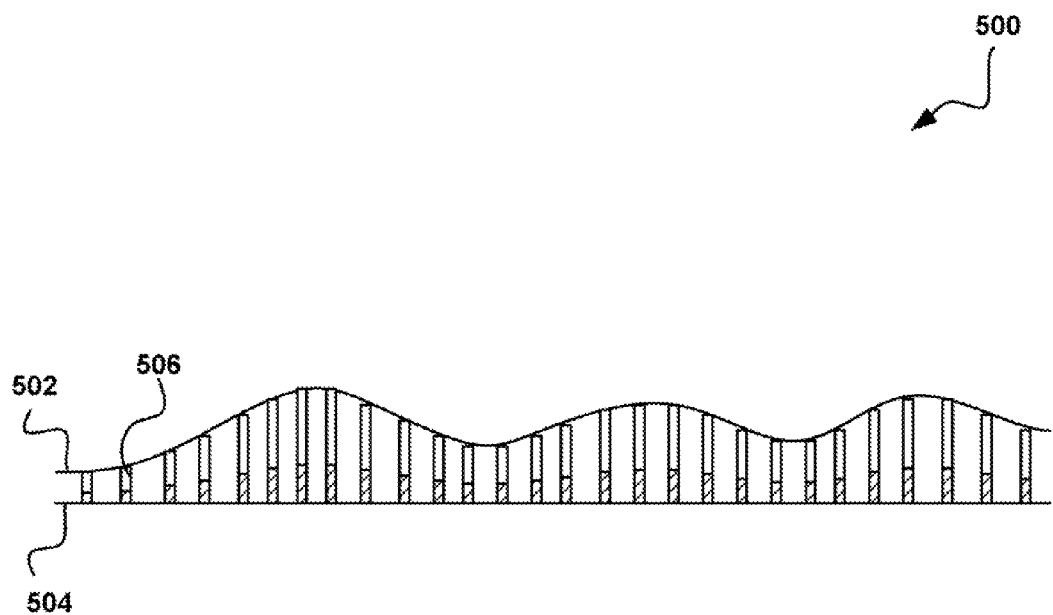
FIG. 5 is a cross-sectional view of a system for providing a deflecting and steerable mirror, in accordance with another embodiment.

FIG. 5 is a cross-sectional view of a system 500 for providing a deflecting and steerable mirror, in accordance with another embodiment. Similar to the system 400 of FIGS. 4A-4B, the present system 500 may be implemented to provide the functionality of the mirror 300 of FIG. 3. Of course, however, the system 500 may be implemented in any desired environment. Again, the aforementioned definitions may apply during the present description.

As shown, a flexible mirror 502 with a continuous flexible surface is provided that is attached to a rigid base 504 via a plurality of pistons 506 coupled therebetween. While only a single row of pistons 506 is shown in the cross-sectional view of FIG. 5, it should be noted that a two-dimension matrix of such pistons 506 may be situated beneath an entirety of the mirror 502. In use, a curvature of any desired portion of the mirror 502 may be controlled by the extension and/or contraction of the appropriate pistons 506. Of course, a ratio of the number of pistons 506 and pixels to be displayed/captured may be varied as desired.

Figure 6:
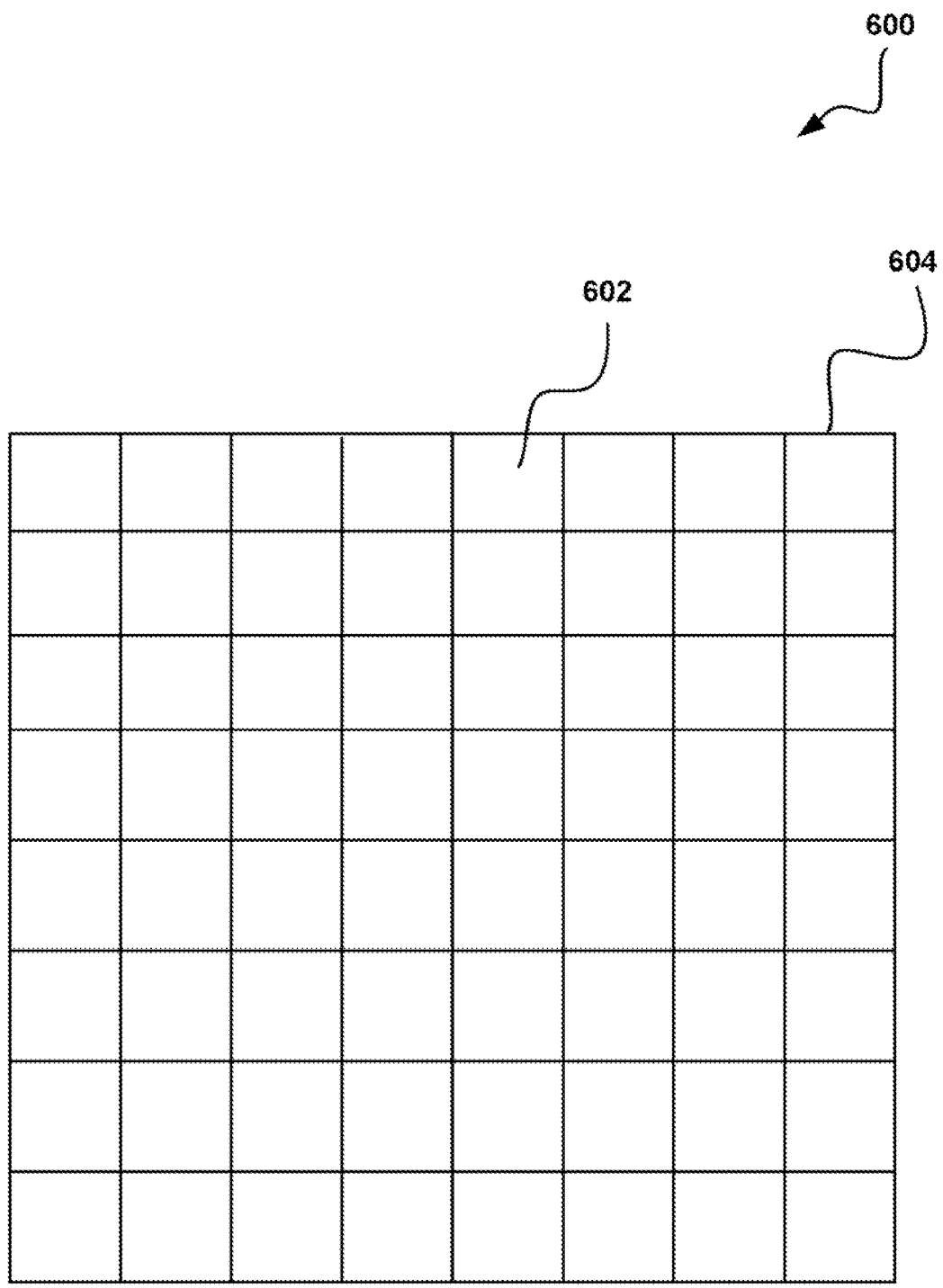
FIG. 6 is a top view of a system including a matrix of deflecting and steerable mirrors for display and/or capture purposes, in accordance with another embodiment.

FIG. 6 is a top view of a system 600 including a matrix of deflecting and steerable mirrors or mirror portions 602 for display and/or capture purposes, in accordance with another embodiment. The present system 600 may be implemented to aggregate a plurality of any of the deflecting and steerable mirrors of FIGS. 3-4B, or using a continuous surface of the system 500 of FIG. 5 with a number of mirror portions. Thus, depending on the desired embodiment, the deflecting and steerable mirrors or mirror portions 602 may be discrete or integral.

Of course, however, the system 600 may be implemented in any desired environment. As shown, the plurality of mirrors or mirror portions 602 are positioned to form a mirror matrix 604, which may be used for a variety of applications, examples of which will be set forth hereinafter in greater detail.

Figure 7:
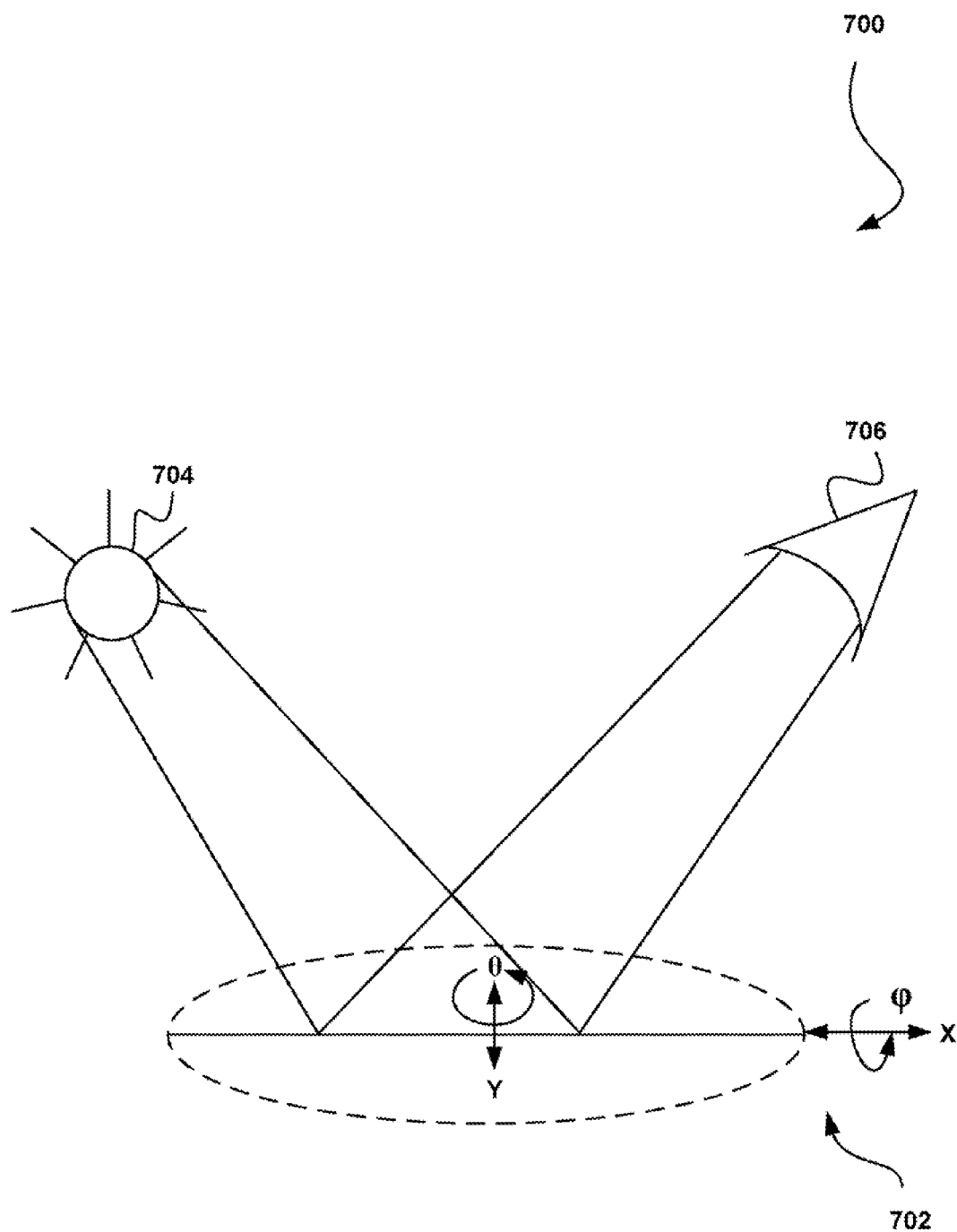
FIG. 7 illustrates a display system including a deflecting and steerable mirror, in accordance with one embodiment.

FIG. 7 illustrates a display system 700 including a deflecting and steerable mirror, in accordance with one embodiment. The present display system 700 may be implemented utilizing any of the deflecting and steerable mirrors of FIGS. 3-5. Further, while a single mirror or movable mirror portion 702 is shown in FIG. 7, it should be noted that a plurality of such mirrors or mirror portions 702 would likely be provided in practice.

As shown, a curvature of the deflecting and steerable mirror or mirror portion 702 is capable of deflecting between a convex and a concave orientation as well as being controlled with respect to two angular dimensions. Of course, such control may be accomplished by way of any desired mechanism(s).

In use, light from a light source 704 reflects off of the mirror or movable mirror portion 702 and is received by a viewer 706 in the context of any display device. In a variety of different embodiments, the light source 704 may take the form of a light emitting diode (LED), laser, digital light processing (DLP) projector, CRT, and/or any other light source, for that matter. Further, the light source 704 may be temporally modulated, spatially modulated, etc.

In any case, the dual deflecting and steerable nature of each mirror or movable mirror portion 702 may allow for any number of desired display applications. In one embodiment, an object may be displayed with a variable resolution (e.g. variable spatial resolution). For example, a first portion of the object may be displayed with a first resolution and a second portion of the object may be displayed with a second resolution. In use, the object may be displayed with a variable resolution by varying a pixel size. Thus, such technique may allow for a variety of perceptually-motivated rendering techniques. Further, some power savings may also result in the generation of resultant images, etc.

In one embodiment, a temporal resolution with which the object is displayed may be varied by trading off a spatial resolution thereof. For example, a plurality of the mirrors/mirror portions may be aimed in different directions, so as to trade off spatial resolution in one part of an image or across a whole field of the image in exchange for additional spatial resolution on regions requiring it, and/or for additional temporal resolution either across the whole image or within specific regions, etc.

In different aspects of the present embodiment, the variable resolution may be changed based the object (e.g. on an image of the object, etc.), a viewer of the object, and/or any other desired factor(s). For instance, a first portion of an image that has very little detail (e.g. that is blank) may be displayed with a lower resolution with respect to a second portion of the image that has a lot of detail, etc. As another example, a portion of an image that is or will likely be the subject of the most attention of a viewer (e.g. a central area of the image, a location indicated as the center of the viewer's gaze by an eye tracking mechanism, etc.) may be displayed with a higher resolution in one embodiment, foveated displays may be provided, in which fewer, larger pixels are drawn where the user is not currently looking, etc.

In another embodiment, the mirrors/mirror portions may form an accommodative display. In use, an object may be displayed at a variable focal depth. In one embodiment, each pixel or each group of pixels of a display may thus depict the object with a different depth. Such an accommodative display is capable of correctly displaying images at a variable focal depth for single-eye accommodation (and not just two-eye stereopsis), for reducing viewer fatigue. In one embodiment, such a system may assume that the display is shining straight mm the eye, without bouncing off an intermediate surface, etc.

In still yet another display-oriented embodiment, a variable focus projector may be provided which can project onto a complicated uneven surface, while still being in focus. Similar to the previous embodiment, such projector may provide a variable focus on a per-pixel or per-pixel group basis. Such a system may ensure that a projected image remains in focus when projecting onto surfaces at significantly different depths (e.g. projecting onto a table and also the floor beneath it, etc.). In various embodiments, such depth may be identified manually and/or automatically (e.g. using known scanning or calibration techniques, etc.).

Of course, the foregoing display applications should not be construed as limiting in any manner whatsoever. For example, other applications are contemplated. In one embodiment, for instance, the display may take the form of a variable resolution printer, a variable focus printer for accommodating printing on an uneven surface, etc.

Figure 8:
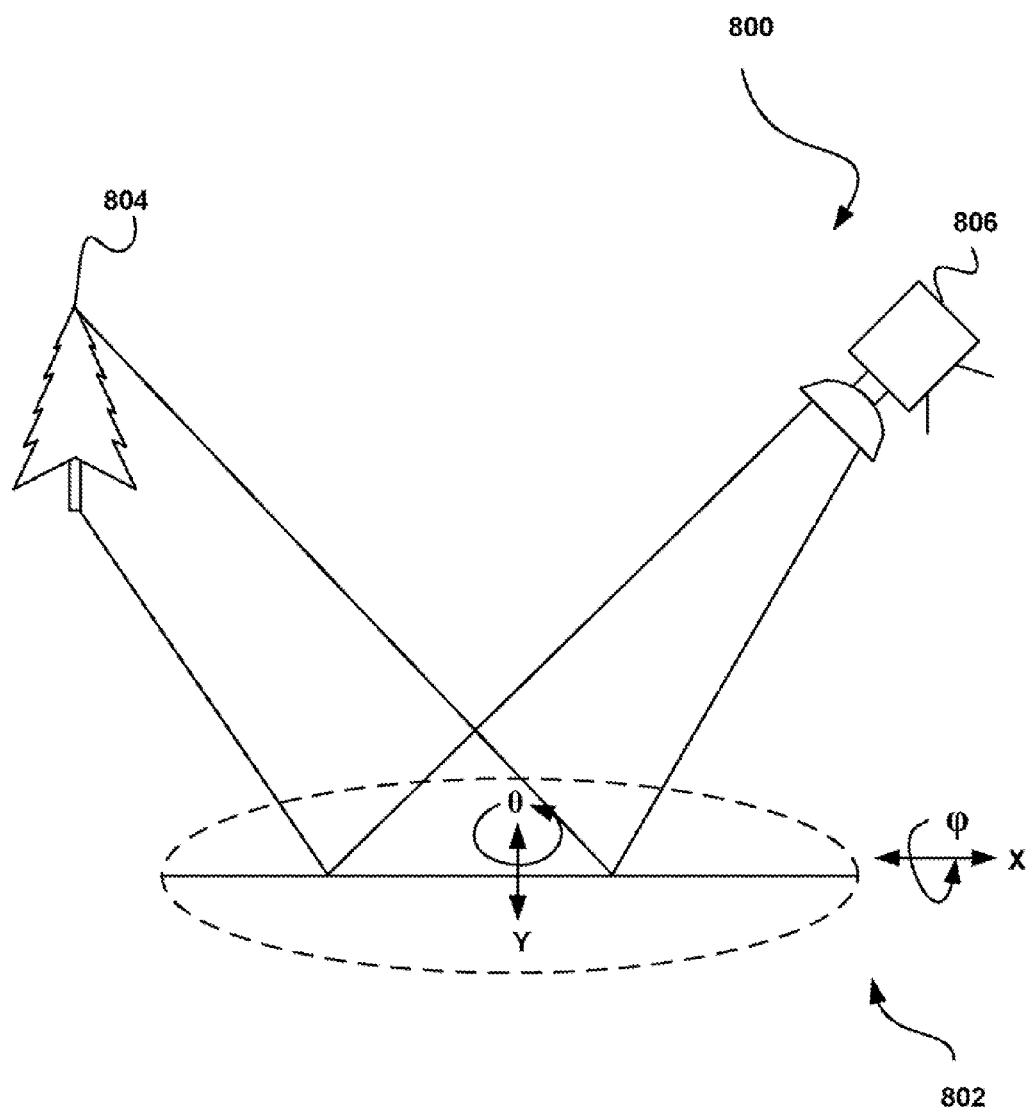
FIG. 8 illustrates a capture system including a deflecting and steerable mirror, in accordance with one embodiment.

FIG. 8 illustrates a capture system 800 including a deflecting and steerable mirror, in accordance with one embodiment. The present capture system 800 may be implemented utilizing any of the deflecting and steerable mirrors of FIGS. 3-5. Similar to the system 700 of FIG. 7, while a single mirror or movable mirror portion 802 is shown in FIG. 8, it should be noted that a plurality of such mirrors or mirror portions 802 may also be provided.

In use, an image of an object 804 reflects off of the mirror or mirror portion 802 and is received by a sensor 806. While the mirror or mirror portion 802 and the sensor 806 are shown to be separate components, it should be noted that, in some embodiments, they may be integrated into a single device (e.g. a camera, etc). By this design, the dual deflecting and steerable nature of the mirror or mirror portion 802 may allow for any number of desired capture applications.

For example, in one embodiment, a spatial resolution with which the object is captured may be varied. For instance, a first portion of the object may be captured with a first resolution and a second portion of the object may be captured with a second resolution. In such embodiment, more mirrors/mirror portions may thus be devoted to more interesting parts of the image which require additional resolution. With camera sensors having a fixed total resolution, the foregoing technique may be used to improve captured image quality under such resolution constraints.

In yet another embodiment, temporal resolution may be varied, in addition to spatial resolution. If, for example, different parts of a sensor (e.g. scanlines) are sampled at different times, the system may sacrifice spatial resolution for temporal resolution by directing the same mirrors/mirror portions at multiple scanlines, etc. in a related embodiment, such technique may be used to devote more camera sensor pixels to dark regions, effectively increasing a dynamic range of the camera by trading off spatial resolution. To this end, variable temporal and/or photometric resolution may be provided by trading off spatial resolution.

In another embodiment, the object may be captured with a variable focus. In particular, a first portion of the object may be captured with a first focus, while a second portion of the object may be captured with a second focus, etc. As an option, this technique may be utilized for removing depth-of-field effects, by focusing different mirrors/mirror portions differently, in another embodiment, such depth-of-field effects may even be introduced for artistic or other purposes. Given mirrors/mirror portions with sufficient deflection capabilities, a lensless focus system may even be provided in which no lenses are used and focus capabilities are provided via the deflecting and steerable mirrors/mirror portions.

in another embodiment, a distance from the object being captured may be determined, utilizing the deflecting and steerable mirrors/mirror portions. To this end, the distance from the aforementioned object may be determined utilizing a camera, for example.

Thus, an enhanced "depth-from-focus" camera implementation may be provided that uses a focal length at which a given image feature is most sharply resolved to determine its depth. The ability to do this at every mirror/mirror portion (with an extremely fast feedback loop) may also allow the camera to determine a depth for each mirror/mirror portion quickly, in milliseconds or potentially even microseconds.

In still yet another capture embodiment, a distance from the object may be determined, utilizing a projector. To this end, "depth-from-projector-defocus" capture may be enhanced using steerable deflecting micro-mirror arrays. In use, a system may project a structured light pattern (e.g. a bar code, grid, etc.) at precisely the focus necessary to correctly resolve current depths of an imaged scene.

To this end, such a system may sense a change in a scene very quickly, as compared to a projected pattern at a single focal length. Specifically, use of a single focal length requires the associated system to cycle focus through the depth range of an entire scene, thus incurring a latency when detecting changes in distance with respect to a moving object(s). On the other hand, by determining the depth of corresponding portions of the moving object(s) using associated steerable deflecting mirrors/mirror portions, the necessary deflection of the individual mirrors and thus the time needed to search for the new correct depth is reduced, since each mirror/mirror portions is already focused at the recent depth of its portion of the object(s) that are changing. Furthermore, the system need only apply computational resources to the portions of the object(s) that are changing, which can potentially reduce computational time and power. Of course, a number of such moving portions may be minimal, particularly when a very short time exists between depth calculation cycles.

Figure 9:
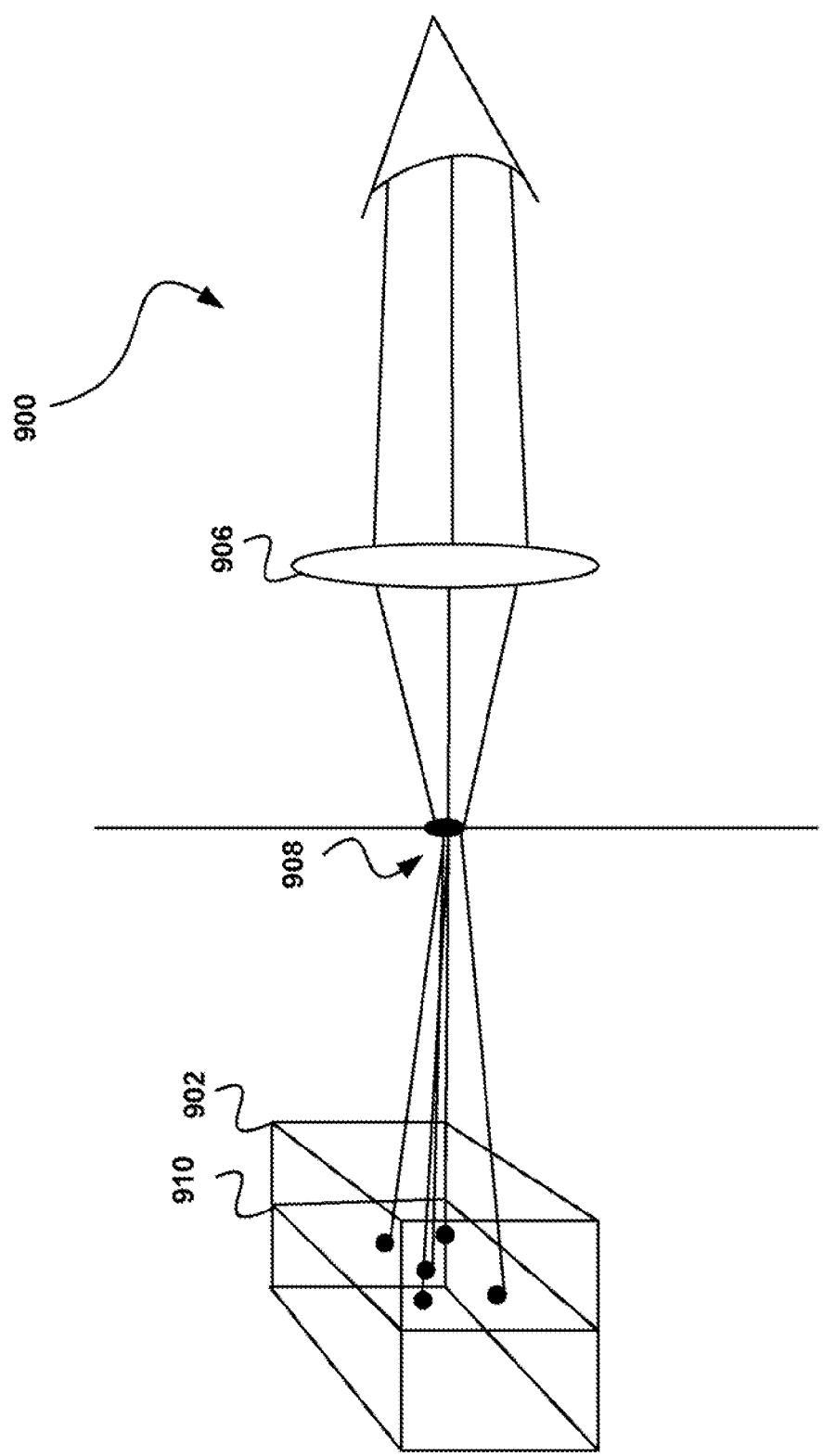
FIG. 9 illustrates a capture system for performing confocal microscopy using a deflecting and steerable mirror, in accordance with one embodiment.

Even still, in additional embodiments, confocal microscopy may be performed utilizing the deflecting and steerable mirrors/mirror portions. FIG. 9 illustrates a capture system 900 for performing confocal microscopy using a deflecting and steerable mirror, in accordance with one embodiment. As shown, a dense three-dimensional mass 902 is viewed through a lens 906 via a pin hole 908 formed in an obstruction. In one embodiment, the dense three-dimensional mass 902 may, for example, include neurons in brain tissue that have been at least partially illuminated using a radiated dye.

By this design, a portion of the dense three-dimensional mass 902 that is situated at a plane 910 positioned a predetermined distance (e.g. a focal length) from the pin hole 908 may be visible via the lens 906. The ability to control the direction and focus of both illuminants and a sensor using arrays of steerable deflecting micromirrors (or with time-multiplexed single mirrors) allows the capture system 900 to selectively image at different depths in the three-dimensional mass 902. In some embodiments, such technique may enable smaller, cheaper confocal microscopy systems.

Of course, the dense three-dimensional mass 902 may take any form, in other embodiments, such as murky water, an image or an object obscured by intervening foliage, etc., in various macroscopic embodiments. Such macroscopic embodiments may have applications in military, deep sea navigation, smoke-filled environments, etc.

Figure 10:
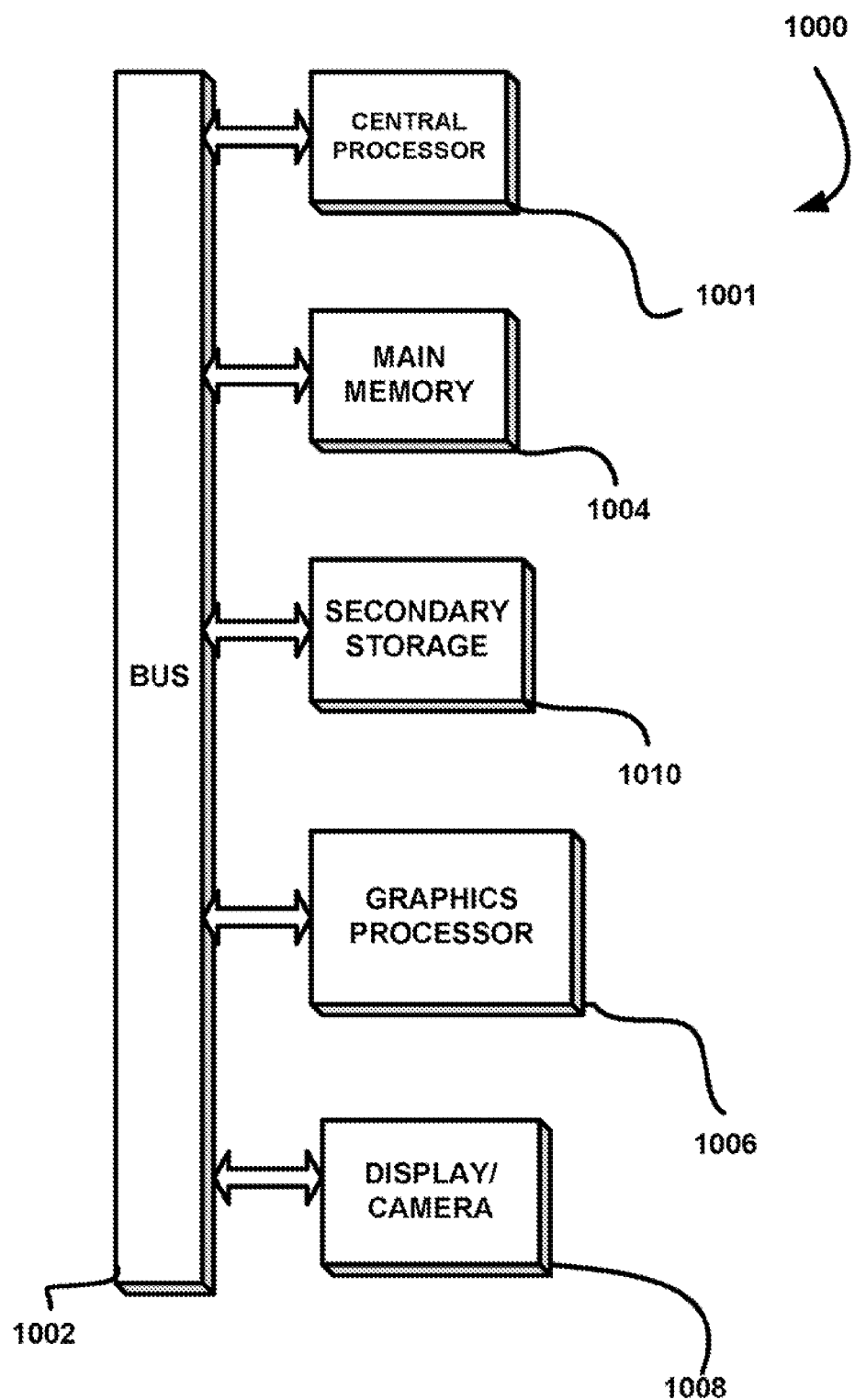
FIG. 10 illustrates an exemplary system in which the architecture and/or functionality of the various previous embodiments may be implemented.

FIG. 10 illustrates an exemplary system 1000 in which the architecture and/or functionality of the various previous embodiments may be implemented. As shown, a system 1000 is provided including at least one host processor 1001 which is connected to a communication bus 1002. The system 1000 also includes a main memory 1004. Control logic (software) and data are stored in the main memory 1004 which may take the form of random access memory (RAM).

In the context of a display system, the system 1000 may include a graphics processor 1006 and a display 1008. In the context of a capture system, the system 1000 may include a camera 1008 (as well as the display, in some embodiments). As mentioned earlier, a printer may be provided as well.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004 and/or the secondary storage 1010. Such computer programs, when executed, enable the system 1000 to perform various functions. Memory 1004, storage 1010 and/or any other storage are possible examples of computer-readable media.

Still yet, the architecture and/or functionality of the various previous figures may be implemented in the context of a general computer system, a circuit board system a game console system dedicated for entertainment purposes, an application-specific system, and/or any other desired system. For example, the system 1000 may take the form of a desktop computer, lap-top computer, and/or any other type of logic. Still yet, the system 1000 may take the form of various other devices m including, but not limited to a personal digital assistant (PDA) device, a mobile phone device, a television, etc. Further, while not shown, the system 1000 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplarpy embodiments, but should be defined only in accordance with the following claims and their equivalents.

What is claimed is:

1. A capture method, comprising:
    capturing an object utilizing at least one minor; and
    controlling a first angular dimension, a second angular dimension, and a curvature of the mirror for manipulating the capture of the object;
    wherein controlling the curvature results in the mirror having a convex, flat, or a concave shape.

2. The method of claim 1, wherein the first angular dimension includes a φ-dimension about an x-axis.

3. The method of claim 1, wherein the second angular dimension includes a θ-dimension about a y-axis.

4. The method of claim 1, wherein the mirror has a length of less than one millimeter.

5. The method of claim 1, wherein a spatial resolution with which the object is captured is varied, utilizing the mirror.

6. The method of claim 5, wherein a temporal resolution with which the object is captured is varied by trading off the spatial resolution, utilizing the mirror.

7. The method of claim 5, wherein a photometric resolution with which the object is captured is varied, by trading off the spatial resolution, utilizing the mirror.

8. The method of claim 1, wherein the object is captured with a variable focus, utilizing the mirror.

9. The method of claim 1, wherein a first portion of the object is captured with a first focus and a second portion of the object is captured with a second focus.

10. The method of claim 1, wherein the object is captured with a variable focus for removing depth of field effects.

11. The method of claim 1, wherein a distance from the object is determined, utilizing the mirror.

12. The method of claim 11, wherein a number of pixels used for the capture is configurable.

13. The method of claim 11, wherein the distance from the object is determined, utilizing a camera.

14. The method of claim 11, wherein the distance from the object is determined, utilizing a projector.

15. The method of claim 1, wherein confocal microscopy is performed, utilizing the mirror.

16. The method of claim 1, wherein the object is captured utilizing a plurality of the mirrors.

17. A computer program product embodied on a computer readable medium, comprising:
    computer code for controlling a first angular dimension, a second angular dimension, and a curvature of at least one mirror for capturing an object;
    wherein the computer program product is operable such that controlling the curvature results in the mirror having a convex, flat, or a concave shape.

18. An apparatus, comprising:
    a processor for controlling a first angular dimension, a second angular dimension, and a curvature of at least one mirror for capturing an object;
    wherein the apparatus is operable such that controlling the curvature results in the mirror having a convex, flat, or a concave shape.

19. The apparatus of claim 18, wherein the processor remains in communication with memory and a camera via a bus.

20. The method of claim 1, wherein the mirror is attached to a rigid base via a plurality of pistons coupled therebetween.

21. The method of claim 20, wherein the curvature of a portion of the mirror is controlled by at least one of the pistons.

22. The method of claim 1, wherein the curvature of the mirror is controlled with electric charges.

23. The method of claim 1, wherein the at least one mirror is positioned to form a mirror matrix, and a curvature of each mirror in the mirror matrix is controlled.

* * * * *